(No Model.)
H. J. ROBERTS.
VEHICLE TONGUE.
No. 278,275. Patented May 22, 1883.
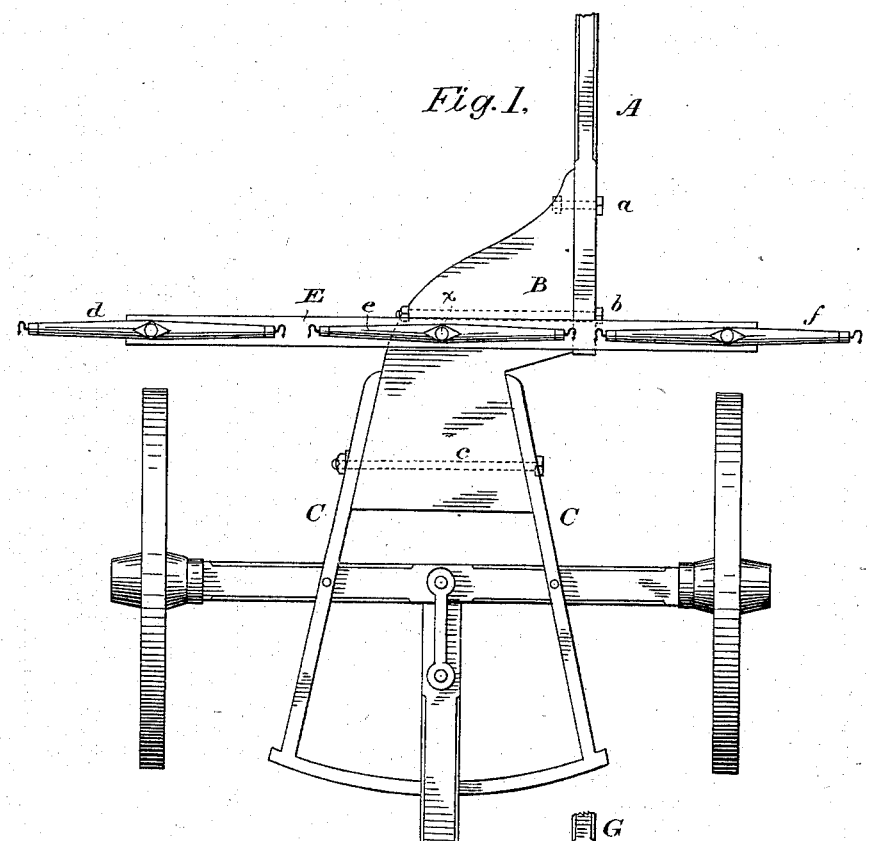
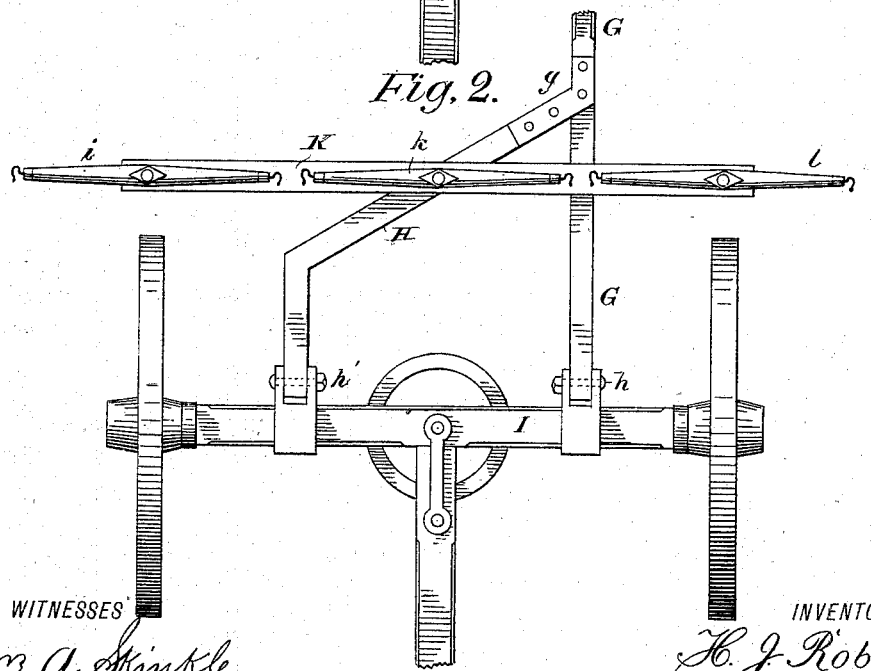
WITNESSES
Wm. A. Skinkle
Ernest Abshagen
INVENTOR
H. J. Roberts
By his Attorneys
Baldwin, Hopkins & Peyton

UNITED STATES PATENT OFFICE.

HOMER J. ROBERTS, OF ORLAND, INDIANA.

VEHICLE-TONGUE.

SPECIFICATION forming part of Letters Patent No. 278,275, dated May 22, 1883.

Application filed March 9, 1882. (No model.)

*To all whom it may concern:*

Be it known that I, HOMER J. ROBERTS, of Orland, in the county of Steuben and State of Indiana, have invented certain new and useful Improvements in Vehicles and Vehicle-Tongues, of which the following is a specification.

The tongue of a vehicle is ordinarily attached centrally thereto in line with the draft, and a horse is placed on each side of the pole or tongue. It is often necessary to employ more than two horses in a team, and heretofore, where three or four horses have been employed, the additional horse or pair of horses has been usually placed in front of the first pair or wheel-horses.

The object of my invention is to provide a vehicle-tongue so applied to a vehicle that three horses may be placed abreast, so that the draft will be properly distributed and the vehicle may be backed and handled with facility.

I am aware that heretofore, in order to accomplish the result above mentioned, a pair of shafts has been attached centrally to a vehicle, and a horse placed between the shafts and one on each side, and I therefore make no claim herein to any such arrangement.

My improved construction and organization are clearly illustrated in the drawings and will be fully described.

Figure 1 is a top or plan view of part of the running-gear of a vehicle, showing my improvements; and Fig. 2 is a similar view, showing a modified construction.

The tongue or pole A is rigidly secured by means of suitable bolts, $a\ b$, to a laterally-projecting portion, B, which is pivoted between the hounds C C by means of a bolt, $c$. The lateral extension B is preferably made of a single piece of wood, and may, if desired, in order to strengthen it, be braced by suitable irons. One end of it fits snugly between the hounds to which it is pivoted, and the other end is deflected sufficiently to one side of the central draft-line to hold the tongue far enough out of line to permit the center horse of the team to occupy a position midway between the wheels of the vehicle and directly in front of the point of draft. A double-tree, E, is pivoted on the portion B of the tongue in the draft-line, and is provided at each end with single-trees $d\ f$ for the attachment of the outside horses. The central horse is attached to the middle single-tree, $e$, which is preferably pivoted upon the same bolt that holds the double-tree. By this construction and organization it will be seen that the middle horse pulls independently from a central draft attachment, while the draft of the outside horses is, as usual, applied at the ends of the ordinary double-tree. By this arrangement three horses abreast may be driven, the draft will be evenly distributed, and as the pole is attached centrally to the vehicle the vehicle can be backed and handled with facility.

In the modified construction shown in Fig. 2, G is a vehicle tongue or pole having a rigid lateral extension, H, which is firmly and rigidly bolted to the tongue at $g$. This lateral portion may consist of upper and lower iron plates or bars and a filling of timber; or it may be made in any way that will give requisite strength. The tongue proper, G, extends backward, and is attached to the axle I by means of a coupling-box, $h$, and the lateral portion H by means of a coupling-box, $h'$. These boxes are placed on each side of the middle axle, at equal distances therefrom, and sufficiently far apart to hold the tongue or pole enough to one side of the central line to accommodate the middle horse. The double-tree K, with the single-trees $i$ and $l$ at its ends, and the central single-tree, $k$, are pivoted on the lateral arm H.

I am aware that heretofore it has been proposed in a harvester-machine to employ a three-horse evener or draft-equalizer in which a pole set to one side or placed out of line with the draft-bar has been used in order to accommodate the operation of the parts, and I therefore make no claim, broadly, to such a pole or such an organization.

What I claim as my invention is—

1. The combination of a vehicle, a pole or tongue centrally attached thereto, the main portion of which is deflected or set to one side of the central line of draft, for the purpose set forth, a double-tree pivoted at its center in the central draft-line of the vehicle, and draft attachments for a three-horse team.

2. The combination of a vehicle, a pole or tongue the main portion of which is deflected or set out of the central draft-line, for the purpose set forth, a draft attachment by which the draft of the middle horse is independently centrally applied to the vehicle, and draft attachments for the outside horses, substantially as set forth.

3. The combination of a vehicle, a tongue or pole the main portion of which is deflected or set to one side of the central draft-line, a double-tree pivoted in the central draft-line of the vehicle for the attachment of the outside horses of the team, and an independent draft attachment or single-tree, also pivoted in the central draft-line, for the middle horse of the team, substantially as set forth.

4. The vehicle-tongue, substantially such as described, the main portion or pole proper of which is deflected or set out of line with the part to be attached to the vehicle, in combination with the double-tree centrally pivoted thereon, and having single-trees, as described, for the attachment of a three-horse team.

5. The combination of the tongue or pole A and the lateral portion or extension-piece B, substantially as described.

6. The combination of a vehicle, a pole or tongue which is set out of the central draft-line, for the purpose set forth, a draft attachment for the middle horse in the central draft-line of the vehicle, and draft attachments for the outside horses.

In testimony whereof I have hereunto subscribed my name this 27th day of February, 1882.

HOMER J. ROBERTS.

Witnesses:
DANIEL H. ROBERTS,
FRANK A. SALISBURY.